US011345431B2

(12) United States Patent
Wallen et al.

(10) Patent No.: US 11,345,431 B2
(45) Date of Patent: May 31, 2022

(54) PRESSURIZED TELESCOPIC FRONT FORK LEG, FRONT FORK AND VEHICLE

(71) Applicant: ÖHLINS RACING AB, Upplands Väsby (SE)

(72) Inventors: Magnus Wallen, Märsta (SE); Edvin Danielsson, Uppsala (SE); Joakim Sundevall, Björklinge (SE); Elias Richloow, Bro (SE)

(73) Assignee: ÖHLINS RACING AB, Upplands Väsby (SE)

( * ) Notice: Subject to any disclaimer, the term of this patent is extended or adjusted under 35 U.S.C. 154(b) by 120 days.

(21) Appl. No.: 16/696,592

(22) Filed: Nov. 26, 2019

(65) Prior Publication Data
US 2020/0094913 A1 Mar. 26, 2020

Related U.S. Application Data

(63) Continuation of application No. PCT/EP2018/064518, filed on Jun. 1, 2018.

(30) Foreign Application Priority Data

Jun. 1, 2017 (EP) .................................... 17173880

(51) Int. Cl.
*B62K 25/08* (2006.01)
*F16F 9/06* (2006.01)
(Continued)

(52) U.S. Cl.
CPC ............. *B62K 25/08* (2013.01); *F16F 9/062* (2013.01); *F16F 9/065* (2013.01); *F16F 9/066* (2013.01);
(Continued)

(58) Field of Classification Search
CPC ......... B62K 25/08; B62K 21/08; F16F 9/062; F16F 9/065; F16F 9/066; F16F 9/368;
(Continued)

(56) References Cited

U.S. PATENT DOCUMENTS

| 7,240,775 B2 * | 7/2007 | Nagai ....................... F16F 9/49 188/266 |
| 7,377,372 B2 * | 5/2008 | Wallen .................... F16F 9/185 188/312 |

(Continued)

FOREIGN PATENT DOCUMENTS

| DE | 2742700 A1 | 3/1978 |
| JP | S5614637 A | 2/1981 |

(Continued)

OTHER PUBLICATIONS

International Search Report for International Application No. PCT/EP2018/064518, dated Sep. 13, 2018 (2 pages).

(Continued)

*Primary Examiner* — Jacob D Knutson
(74) *Attorney, Agent, or Firm* — Kagan Binder, PLLC

(57) ABSTRACT

A front fork for a vehicle comprises a telescopic fork leg having an outer tube and an inner tube telescopically arranged relative each other. A main piston arrangement in the inner tube regulates a damping fluid for damping movements between two parts of the vehicle. The telescopic fork leg comprises a pressurizing piston arranged in the inner tube and configured to pressurize the damping fluid. The pressurizing piston comprises an axial first end portion facing the main piston arrangement an axial opposite second end portion facing a pressurized volume. A fluid reservoir for holding a pressurized fluid is fluidly coupled to the pressurized volume. The pressurizing piston is coaxially arranged with the main piston arrangement, inside the inner tube. The fluid reservoir is at least partly arranged on an (Continued)

Figure 1A:
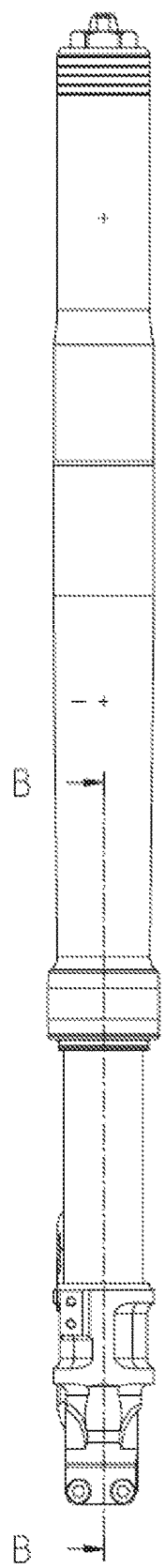

outside of the inner tube. Also, a front fork and a vehicle having fork legs according to above are described.

17 Claims, 5 Drawing Sheets

(51) Int. Cl.
    *F16F 9/36*     (2006.01)
    *F16F 9/512*     (2006.01)
    *F16F 9/516*     (2006.01)

(52) U.S. Cl.
    CPC .............. *F16F 9/368* (2013.01); *F16F 9/512* (2013.01); *F16F 9/516* (2013.01); *F16F 2222/12* (2013.01); *F16F 2228/066* (2013.01); *F16F 2232/08* (2013.01)

(58) Field of Classification Search
    CPC ........ F16F 9/512; F16F 9/516; F16F 2222/12; F16F 2228/006; F16F 2232/08
    See application file for complete search history.

(56) References Cited

U.S. PATENT DOCUMENTS

| | | | | |
|---|---|---|---|---|
| 2010/0207350 A1* | 8/2010 | Uchiyama | ............... | F16F 9/462 |
| | | | | 280/276 |
| 2011/0084464 A1* | 4/2011 | Inoue | ............... | F16F 9/56 |
| | | | | 280/276 |
| 2011/0202236 A1* | 8/2011 | Galasso | ............... | F16F 9/3264 |
| | | | | 701/37 |
| 2012/0187652 A1* | 7/2012 | Wimmer | ............... | F16F 9/067 |
| | | | | 280/276 |
| 2015/0211595 A1* | 7/2015 | Ikeda | ............... | F16F 9/466 |
| | | | | 188/314 |
| 2018/0087594 A1* | 3/2018 | Tomiuga | ............... | F16F 13/007 |

FOREIGN PATENT DOCUMENTS

| | | | | |
|---|---|---|---|---|
| JP | 2005054863 A | | 3/2005 | |
| JP | 2007132511 A | | 5/2007 | |
| JP | 6270875 B2 | | 1/2018 | |
| WO | WO-2016075156 A1 * | | 5/2016 | ............... F16F 9/44 |

OTHER PUBLICATIONS

E-Space abstract and E-Space Translation for DE 2742700.
E-Space abstract for JP S5614637.
Japanese Office Action, and English translation thereof, for Japanese Counterpart Application No. 2019-566138, dated Mar. 8, 2022, (10 pages).
E-Space English abstract for JP 2005054863 A.
E-Space English abstract for JP 2007132511 A.
E-Space English abstract for JP 6270875 B2.

\* cited by examiner

PRESSURIZED TELESCOPIC FRONT FORK LEG, FRONT FORK AND VEHICLE

CROSS REFERENCE TO THE RELATED APPLICATION

This application is a continuation application, under 35 U.S.C. § 111(a), of international application No. PCT/EP2018/064518, filed on Jun. 1, 2018, which claims priority on European Patent Application No. 17173880.0 filed on Jun. 1, 2017, the entire content of both of which are incorporated herein as a part of the application.

TECHNICAL FIELD

The present specification generally relates to the field of front fork for vehicles and in particularly discloses a pressurized front fork leg.

TECHNICAL BACKGROUND

Shock absorbers and damping systems are used for damping of the relative movement between the wheel and the chassis of a vehicle, such as a car, a motorcycle or a bicycle. A conventional shock absorber normally comprises a working cylinder filled with a damping fluid, such as hydraulic oil or gas, and a piston arranged on a piston rod movably arranged in the cylinder. The piston is further commonly arranged to divide the cylinder into a first and second working chamber and moves in the cylinder against the resistance of the fluid, which in turn causes damping fluid to move in the damping cylinder. The shock absorber, or damper, may be arranged between the vehicle chassis and the wheel to move telescopically as the vehicle travels along such that the movement of the wheel and vehicle is thus damped by the piston moving in the cylinder against the resistance of the fluid. In the specific case of a motorcycle, a bicycle, or a mountain bike, shock absorbers may be arranged in a front fork arrangement and/or between the rider and the rear part of the motorcycle or bicycle, in either case damping impacts and vibrations with respect to the rider.

Further, in order to improve the damping dynamics of a shock absorber in a front fork, the damping fluid may be pressurized with a compressing pressure. However, pressurized front forks have a tendency to increase in size and become rather expensive.

SUMMARY OF THE INVENTION

Accordingly, it would be desirable to provide an improved front fork shock absorber system. The invention is based on the inventor's realization that the pressurizing function of the front fork may be achieved by a pressurizing piston arranged coaxially inside a damping fork leg fluidly connected with a fluid reservoir for holding pressurized fluid arranged outside said damping leg, so that said fluid reservoir, at least partly, may axially overlap the fork leg. Hereby, a pressurized fork leg is provided that is both less expensive and smaller than prior art. Further, having the pressurizing piston arranged inside the front fork leg in a damping system with damping oil has led to the surprising effect that undesired hysteresis is decreased since less damping oil may be used. The decrease of undesired hysteresis is partly due to that all damping oil comprise some air/gas in it and also that the oil is not traveling in channels outside of the fork leg, since that may contribute to undesired hysteresis.

The above mentioned advantages are achieved by a front fork leg, front fork, and vehicle according to the independent claims is provided. Some embodiments are defined in the dependent claims.

According to a first aspect of the invention a telescopic fork leg for a front fork of a vehicle, comprising an outer tube and an inner tube being telescopically arranged relative each other, and a main piston arrangement arranged in the inner tube configured to regulate a damping fluid for damping movements between two parts of the vehicle when in use. Further, the telescopic fork leg comprises a pressurizing piston arranged in the inner tube and configured to pressurize the damping fluid, the pressurizing piston comprising an axial first end portion facing the main piston arrangement, and further comprising an axial opposite second end portion facing a pressurized volume. Further, the telescopic fork leg comprises a fluid reservoir for holding a pressurized fluid, the fluid reservoir being fluidly coupled to the pressurized volume. Further, the pressurizing piston is coaxially arranged with the main piston arrangement, inside the inner tube and the fluid reservoir is at least partly arranged on an outside of the inner tube.

Hereby, as implied above, a pressurized fork leg is provided that is both less expensive, is smaller than prior solutions and has decreased levels of undesired hysteresis since less damping oil may be used.

In the context of the application "fluidly coupled" should be understood as any coupling means such as a channel, pipe, hose or other fluid connection means. Moreover, in the context of the application, the wording that the pressurizing piston is "arranged, [. . . ] inside said inner tube" comprise the different embodiments where the pressurizing piston may be arranged directly or indirectly in the inner tube, by being arranged inside one (or several) other components located inside the inner tube.

Further, since the pressurizing piston is arranged inside the inner tube instead of in the fluid reservoir, the dimensions of the fluid reservoir may be created with less accuracy, since there is no piston moving inside said fluid reservoir.

According to one embodiment, the fluid reservoir is arranged in a fork leg bottom body. In one embodiment, the fluid reservoir is an aperture in the for leg bottom body. In one embodiment the aperture is a bore, drilled into said log bottom body. Hereby, the fluid reservoir may be integrated in a compact manner without affecting the length of the fork leg, and achieved in a very cost efficient manner.

According to yet one embodiment, the pressurizing piston comprises a first sealing means configured to seal against the damping fluid, and a second sealing means configured to seal against the pressurized fluid, wherein the first and second sealing means are axially displaced along the axial extension of the pressurizing piston. Hereby, the pressurizing piston may seal with adapted seals at the respective ends, and any pressurized fluid leaking through the respective seal may be handled between the seals. Hereby, the pressurizing piston may act as a separating piston for separating the gas from the liquid.

According to one embodiment, the damping fluid is a liquid such as damping oil, and the pressurized fluid is a gas, such as air, nitrogen, CO2.

According to yet one embodiment, the pressurizing piston is axially pressure relived. In one embodiment the pressure from the gas side and pressure of the damping fluid relieves each other.

According to one embodiment, the telescopic fork leg may further comprise a cylinder case arranged inside the inner tube, wherein the pressurizing piston is arranged inside the cylinder case. Hereby, the cylinder case and inner tube may define an ambient volume for holding damping fluid.

According to yet one embodiment, the telescopic fork leg further comprises a fluid coupling between the damping fluid and an ambient volume. Hereby, the damping fluid may flow into the ambient volume.

According to one embodiment, the fluid coupling between the damping fluid and an ambient volume is enabled by an aperture in the cylinder case axially located between the first sealing means and the second sealing means. Hereby, any liquid or gas leaked through the respective seals may flow out to the ambient volume.

According to yet one embodiment, the first sealing of the pressurizing piston is configured interact with the aperture in the cylinder case so that the fluid coupling between the damping fluid and an ambient volume is only opened when the pressurizing piston is in a predetermined axial position. Hereby, the coupling between the damping fluid and an ambient volume may be closed by means of the first sealing means in ordinary use, but when the volume with damping fluid is increased so much that the axial position of the preloading piston reaches the predetermined axial position, the damping fluid is let out through the aperture in the cylinder case to the ambient volume.

According to yet one embodiment, the telescopic fork leg further comprises an intermediate restriction means arranged between the main piston and the pressurizing piston, and configured to restrict the axial movement of the pressurizing piston. Hereby, the intermediate restriction may restrict the axial movement of the pressurizing piston if something fails in the damper.

According to yet one embodiment, the restriction means is further configured to restrict the fluid flow at high stroke speeds. Hereby, at high stroke speeds the pressurizing piston may be prevented to move as the check valve maximum flow capacity is reached so that the check valve constitute a restriction for the flow. In this context, high stroke speeds may be e.g. 2-6 m/s, or 3-5 m/s.

According to yet one embodiment, the main piston arrangement comprises a shim stack and a check valve for controlling the flow a damping fluid. Hereby, the damping fluid flow may be controlled at the piston arrangement.

According to yet one embodiment, the telescopic fork leg is one of a compression leg and a rebound leg, configured to mainly damp movements in the compression stroke or the rebound stroke, respectively.

Hereby, the compression and rebound fine tuning settings may be kept separated.

According to yet one embodiment, the piston comprises an electrically controlled valve for controlling the flow of damping medium.

According to yet one embodiment, the electrically controlled valve comprises a spool at least partly having the shape of a hollow cylinder, the cylinder comprising a first fluid opening and a second fluid opening such that a flow of fluid is allowed to flow through the hollow cylinder from the inlet to the outlet via the first and second fluid opening.

According to a second aspect, the above-discussed objectives are achieved by a front fork for a vehicle, comprising two telescopic fork legs according to any one the embodiments above.

According to yet one embodiment, one of the two telescopic fork legs is a compression leg configured to mainly damp movements in the compression stroke, and the other one of the two telescopic fork legs is a rebound leg config-ured to mainly damp movements in the rebound stroke. Hereby, the compression and rebound fine tuning settings may be kept separated.

According to a second aspect, the above-discussed objectives are achieved by a vehicle comprising a front fork according to any of the embodiments described above.

In one embodiment, the main piston arrangement comprises a main piston and a main piston rod coupled to the main piston. The main piston being configured to regulate a damping fluid moving between a first chamber and a second chamber.

Further objectives of, features of and advantages of the present invention will become apparent when studying the following detailed disclosure, the drawings and the appended claims. Those skilled in the art realize that different features of the present invention can be combined to create embodiments other than those described in the following.

SHORT DESCRIPTION OF THE APPENDED DRAWINGS

Figure 1B:
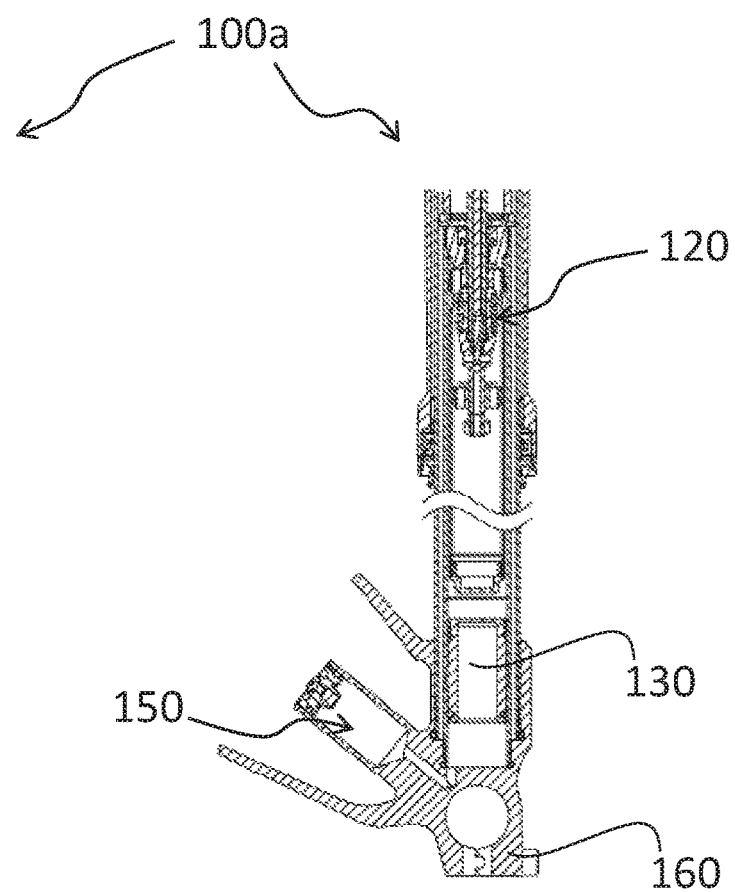
Figure 1C:
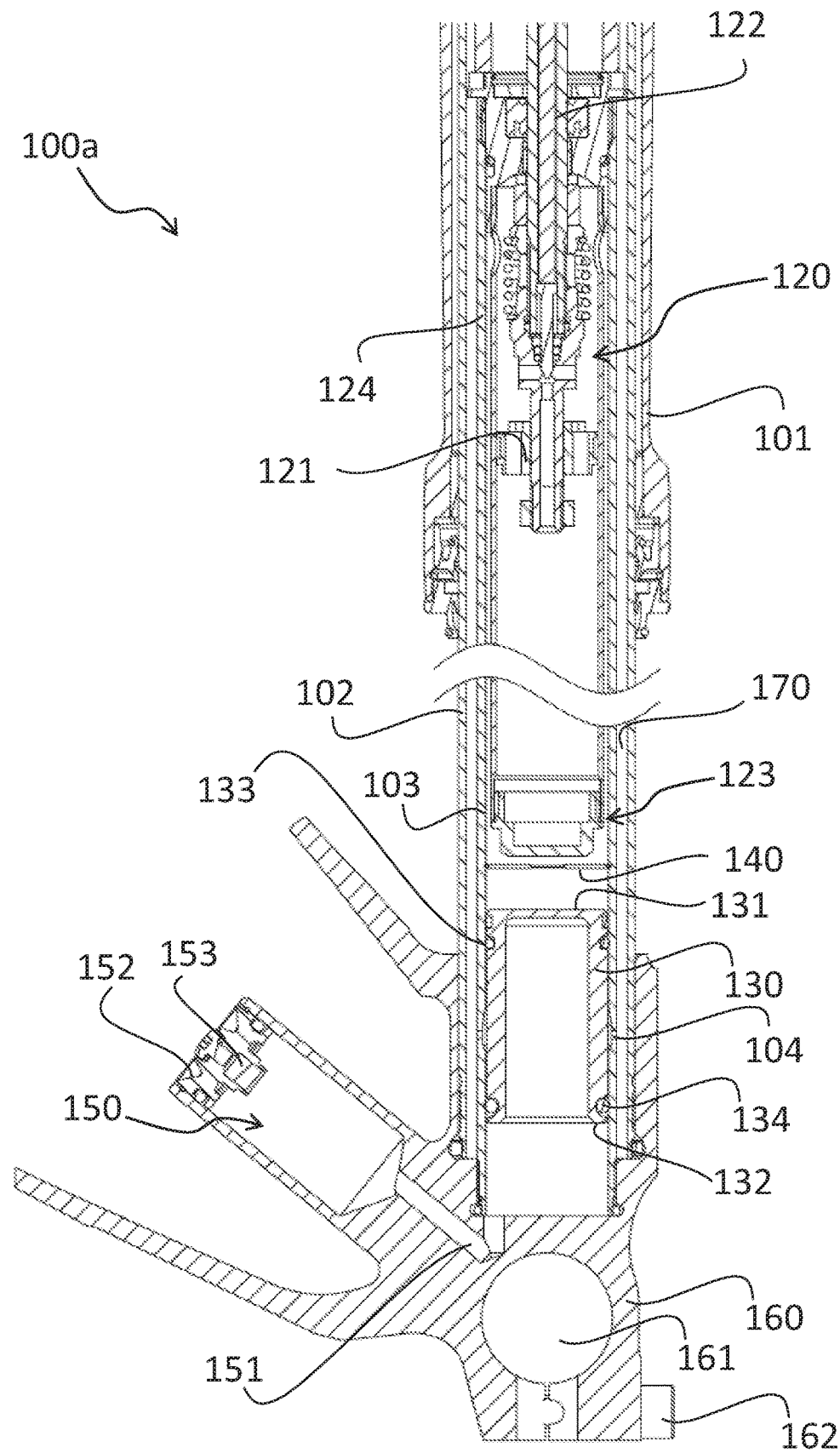
Figure 2:
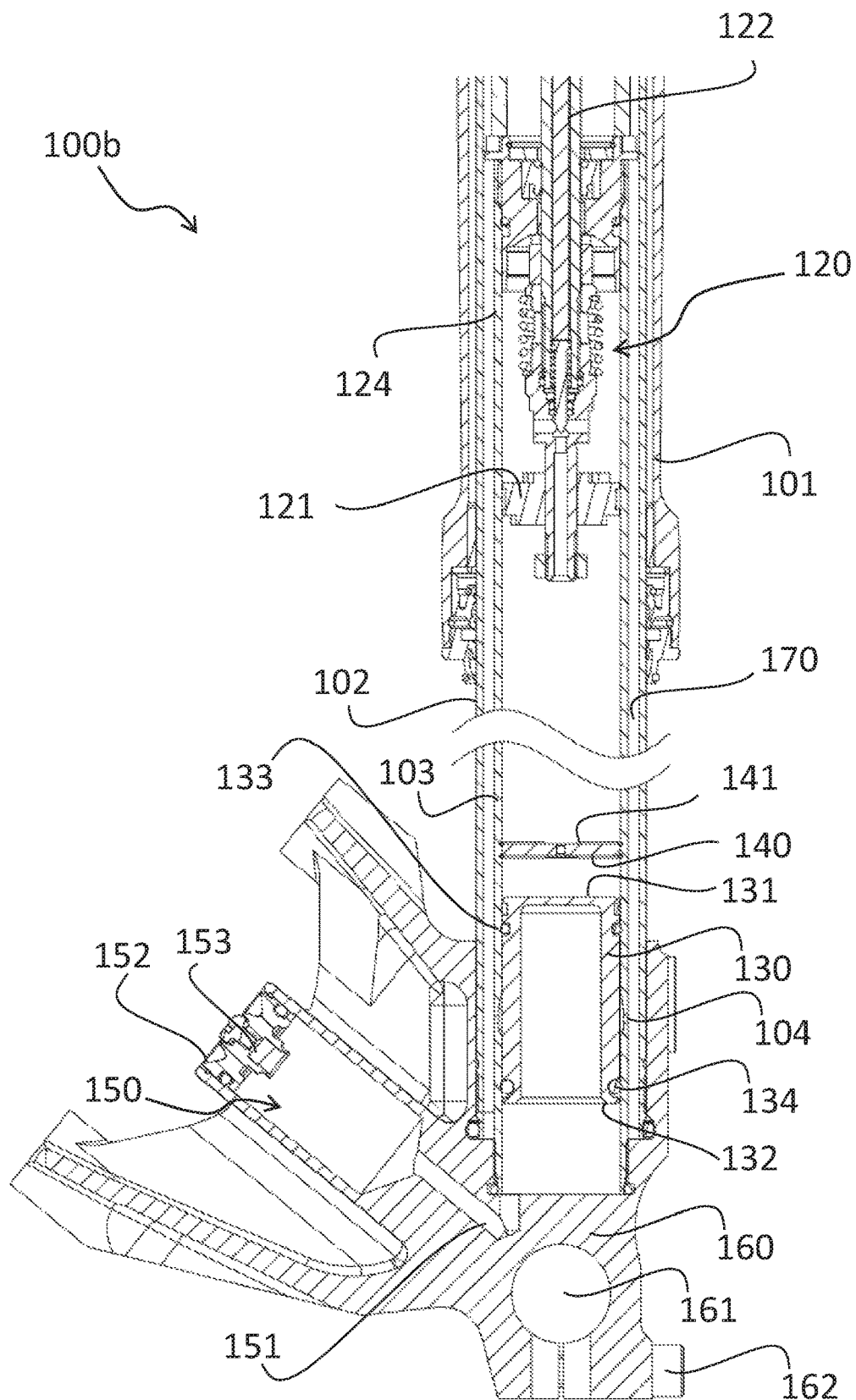
Figure 3:
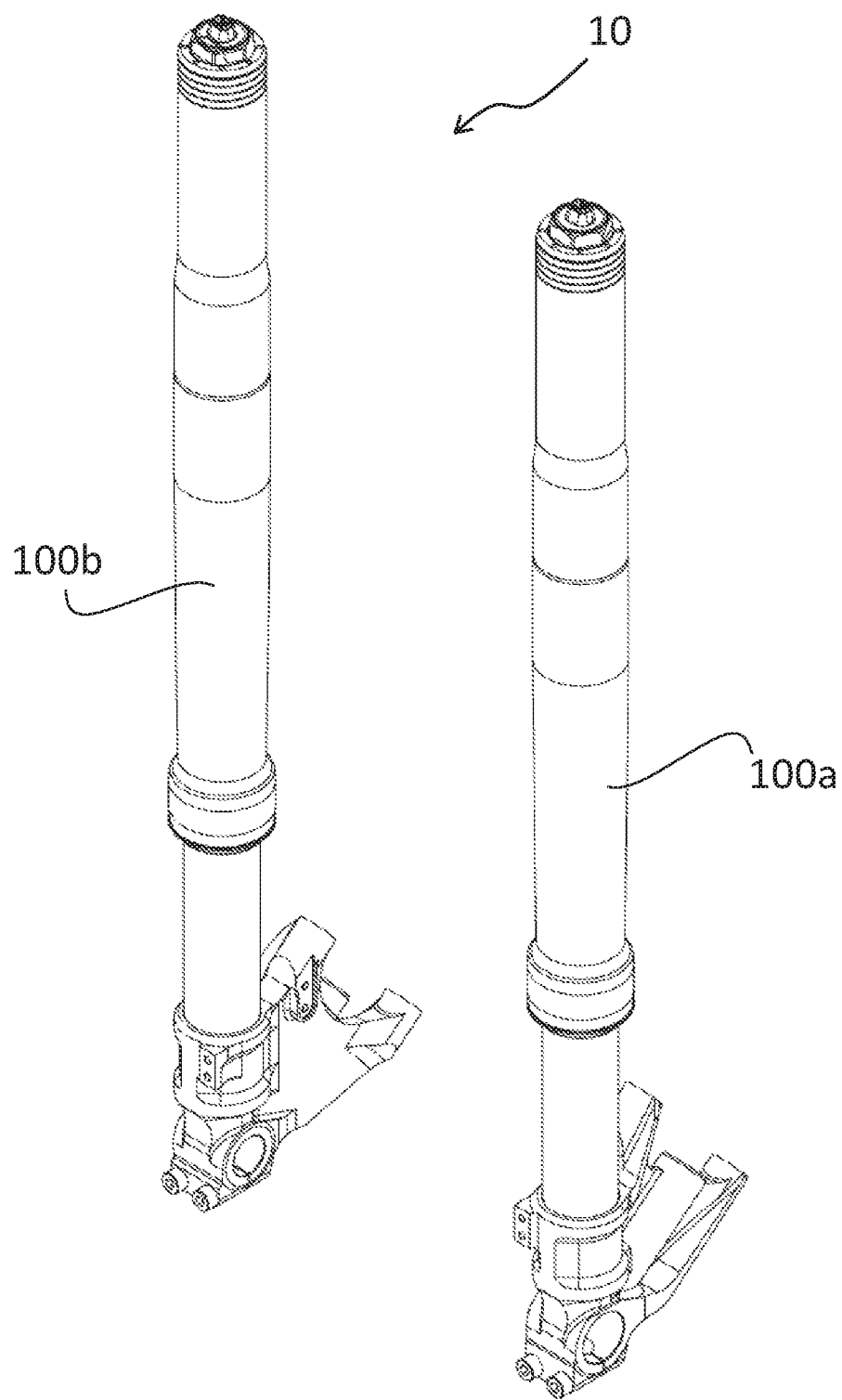
Figure 4A:
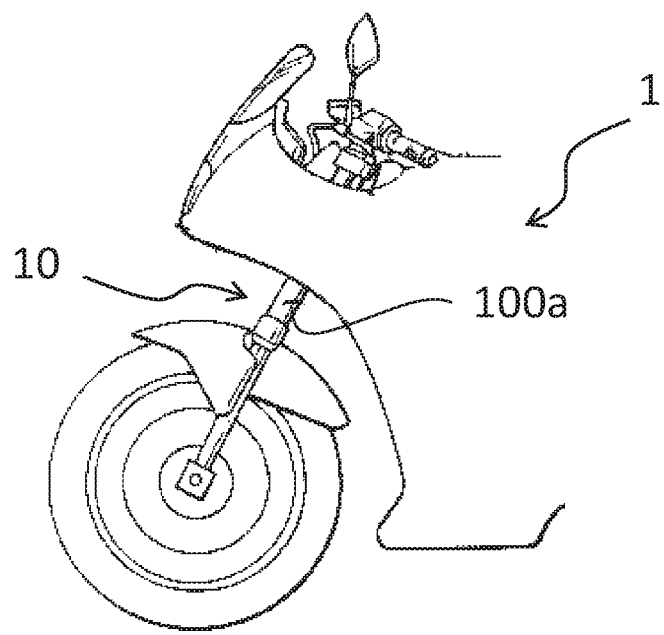
Figure 4B:
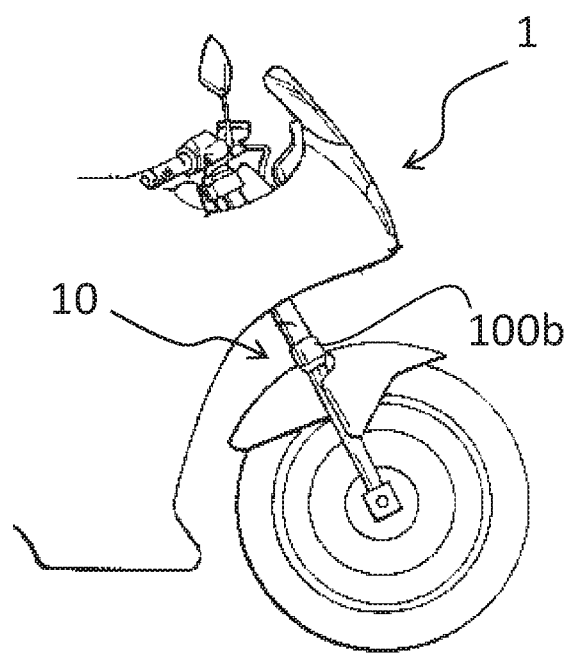

The invention will be understood through the following illustrative and non-limiting detailed description of preferred embodiments, with reference to the appended drawing, on which:

FIG. 1a shows a front fork leg from an outside view,

FIG. 1b shows a cross-section along B-B of the same fork leg, being a compression leg, FIG. 1c shows a close-up of FIG. 1b, disclosing more details of the fork leg components, FIG. 2 shows a close-up of a rebound-leg, FIG. 3 shows a front fork having two fork legs, FIG. 4a shows a left-side view of a motorcycle having a front fork, and FIG. 4b shows a right-side view of a motorcycle having a front fork.

DETAILED DESCRIPTION

All figures are schematic, not necessarily to scale, and generally only show parts which are necessary in order to elucidate the invention, wherein other parts may be omitted or merely suggested. Throughout the figures the same reference signs designate the same, or essentially the same features.

Although the fork legs in the illustration are illustrated as having a first leg for compression damping and a second leg for rebound damping, the invention is equally applicable when the legs are designed to damp both rebound and compression movements in a single leg.

Further, although the figures all include an inner cylinder 103, it would be possible to carry out the invention without said inner cylinder. That is, the pressurizing piston may be arranged directly in the inner tube 102 or indirectly by being arranged inside one (or several) other components located inside the inner tube 102. The embodiment where the pressurizing piston is arranged directly in the inner tube would be a monotube fork leg. In such an embodiment the ambient volume 170 could be on the outside of the inner tube.

FIG. 1a and 1b are included to illustrate an overview of a front fork leg 100a from an outside view, and in a cross-section along the line "B-B" in FIG. 1a. The front fork leg 100a is a compression leg, and is illustrated in further detail in FIG. 1c. The compression front fork leg 100a comprise a main piston arrangement 120 for regulating the damping fluid. Further, it comprises the pressurizing piston 130, which at a first end face that damping fluid (upwards in the figure) and at the other ends face a pressurizing gas which is fluidly connected to a fluid reservoir 150. The fluid reservoir is arranged in the fork leg bottom body 160.

The compression front fork leg 100a, is now further discussed in relation to the close-up in FIG. 1c. Here, all the components as discussed above in relation to FIG. 1b are also present, and in addition more details are illustrated. Moreover, the components in the rebound front fork 100b illustrated in FIG. 2 comprise most of the components described in relation to FIG. 1c.

Starting from the bottom of the figure, the fork leg bottom comprises an aperture 161 for fitting a wheel axle of a front wheel of a vehicle. The front wheel axle may be fastened by a fastening arrangement 162.

Further the fluid reservoir 150 arranged in the fork leg bottom body 160, comprise a fluid connection 151 to the inside of the inner tube 102. In the illustrated embodiment, the fluid connection 151 connects the fluid reservoir with the cylinder case (103). The fluid connection may be achieved in any way but is illustrated as two bores, drilled from two directions, one from the cylinder case side and one from the fluid reservoir side. Further, the fluid reservoir 150 comprises an end cap 152 and in the end cap there is a valve 153 for filling the fluid reservoir to a desired pressure. In the illustrated embodiment, the fluid reservoir is a bore into the fork leg bottom body 160. Hereby, a simple and cost efficient fluid reservoir is achieved.

Moving on upwards, the pressurizing piston 130, it is arranged in a cylinder case 103 which in turn is arranged in an inner tube 102. The pressurizing piston is configured to pressurize the damping fluid, whereby it comprises an axial first end portion 131 facing the main piston arrangement 120 (upwards in the figure), and further comprising an axial opposite second end portion 132 which is facing the pressurized volume being fluidly connected to the fluid reservoir 150.

Further, the pressurizing piston 130 comprise a first sealing means 133 which is configured to seal against the damping fluid. It also comprises a second sealing means 134 which is configured to seal against the pressurized fluid. Further, the first and second sealing means are axially displaced along the axial extension of the pressurizing piston 130, so that the first sealing means 133 is arranged on/close to the first end portion 131, and the second sealing means 134 is arranged on/close to the second end portion 132.

The cylinder case 103 comprises an aperture 104 being axially located between said first sealing means 133 and said second sealing means 134 under normal use. The aperture allows a fluid coupling between the damping fluid and an ambient volume 170.

The first sealing 133 of the pressurizing piston is further sized and adapted to interact with the aperture 104 in the cylinder case 103 so that the fluid coupling between the damping fluid and an ambient volume 170 is only open when the pressurizing piston 130 is in a predetermined axial position. The predetermined axial position being closer to the fork leg bottom 160 than under normal use. Hereby, the damping medium may escape into the ambient volume 170 instead of pushing the pressurized piston further towards the fork leg bottom. This makes the system self-adjusting in terms of oil/damping medium levels.

Hereby, the aperture may be closed by means of the first sealing means 133 during ordinary use, but when the volume with damping fluid is increased so much that the axial position of the preloading piston reaches the predetermined axial position, the damping fluid is let out through the aperture 104 in the cylinder case 103 to the ambient volume 170.

Moving further upwards, the fork leg comprise an intermediate restriction means 140 arranged between the main piston and the pressurizing piston. Moreover, the compression leg comprises an additional tube to which the end lock portion 123 is attached forming an end so that pressure in compression stroke is built up between the main piston 121 and the end-lock 123. Damping medium will be transported back and forth between the space above the pressurizing piston 130 and the space above the main piston 121 This occurs in the gap between the two tubes and through an opening in an upper region of the inner pipe. This opening is adapted to throttle the flow to a suitable extent, namely to avoid that the pressurizing piston 130 moves due to pressure build up during a compression stroke in same manner as restriction means 140 does in a rebound leg. It could be preferable to use unthrottled openings in the upper regions of the inner tube and use throttle plates instead. This since it would be possible to obtain more suitable flow dynamics. Such solution would, however, be costlier.

Finally, the fork leg comprises a main piston arrangement 120 as discussed above. The piston arrangement comprises a main piston 121 having a shim stack and a check valve for controlling the flow a damping fluid. Moreover, the piston arrangement is connected to a piston rod 122.

Moving on the rebound fork leg 100b, as illustrated in FIG. 2, most of the components are identical with (or at least corresponding to) the components as has been discussed in relation to the compression for leg 100a. This is especially true for the lower part of the fork leg including the fork leg bottom body 160 the fluid reservoir 150 and the pressurizing piston 130 arrangement.

One illustrated difference is that the fork leg's intermediate restriction means 140, being arranged between the main piston 121 and the pressurizing piston 130 comprise a valve arrangement 141 being configured to restrict fluid flow of the damping medium at high stroke speeds (as discussed above, high stroke speed may be about 2-6 m/s in this context).

Further, the main piston arrangement 120 differs to some extent compared to the piston arrangement as illustrated in the compression fork leg 100a. Also in the rebound leg, the piston arrangement comprises a main piston 121 having a shim stack and a check valve for controlling the flow a damping fluid.

Moving on, FIG. 3 shows a front fork having two fork legs, one being illustrated as the compression fork leg 100a, and the other one being the rebound fork leg 100b. The fork legs are sized and adapted to be mounted on a respective side of a vehicle wheel, and to damp movements between the wheel and a vehicle chassis.

Further, FIG. 4a shows a left-side view of a motorcycle (vehicle) 1 having a front fork 10, and FIG. 4b shows a right-side view of the same motorcycle 1 with the front fork 10. When looking from the left-hand view in FIG. 4a the compression front fork leg 100a is visible, and when looking from the right-hand view in FIG. 4b the rebound front fork leg 100b is visible.

While the invention has been illustrated and described in detail in the drawings and foregoing description, such illustration and description are to be considered illustrative or exemplary and not restrictive; the invention is not limited to the disclosed embodiments. The skilled person understands that many modifications, variations and alterations are conceivable within the scope as defined in the appended claims.

Additionally, variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to obtain an advantage. Any reference signs in the claims should not be construed as limiting the scope of the claims.

The invention claimed is:

1. A front fork for a vehicle, comprising a telescopic fork leg, said telescopic fork leg comprising;
   an outer tube and an inner tube being telescopically arranged relative each other,
   a main piston arrangement arranged in said inner tube configured to regulate a damping fluid for damping movements between two parts of said vehicle when in use, wherein the telescopic fork leg further comprises,
   a pressurizing piston arranged in said inner tube and configured to pressurize the damping fluid, said pressurizing piston comprising an axial first end portion facing said main piston arrangement, and further comprising an axial opposite second end portion facing a pressurized volume,
   a fluid reservoir for holding a pressurized fluid, said fluid reservoir being fluidly coupled to said pressurized volume, and
   a fluid coupling between the damping fluid and an ambient volume, wherein
   said pressurizing piston is coaxially arranged with said main piston arrangement, inside said inner tube and said fluid reservoir is at least partly arranged on an outside of said inner tube.

2. The front fork according to claim 1, wherein said fluid reservoir is arranged in a fork leg bottom body.

3. The front fork according to claim 1, wherein said pressurizing piston comprises a first sealing means configured to seal against the damping fluid, and a second sealing means configured to seal against the pressurized fluid, wherein said first and second sealing means are axially displaced along an axial extension of the pressurizing piston.

4. The front fork according to claim 3, further comprising a cylinder case arranged inside said inner tube, wherein said pressurizing piston is arranged inside said cylinder case, and wherein said fluid coupling between the damping fluid and the ambient volume is enabled by an aperture in said cylinder case axially located between said first sealing means and said second sealing means.

5. The front fork according to claim 4, wherein the first sealing of said pressurizing piston is configured interact with the aperture in the cylinder case so that said fluid coupling between the damping fluid and the ambient volume is only opened when the pressurizing piston is in a predetermined axial position.

6. The front fork according to claim 1, wherein said damping fluid is a liquid, and said pressurized fluid is a gas.

7. The front fork according to claim 6, wherein the gas is selected from the group consisting of air, nitrogen, and $CO_2$.

8. The front fork according to claim 1, further comprising a cylinder case arranged inside said inner tube, wherein said pressurizing piston arranged inside said cylinder case.

9. The front fork according to claim 1, further comprising an intermediate restriction means arranged between the main piston and the pressurizing piston, and configured to restrict the axial movement of the pressurizing piston.

10. The front fork according to claim 9, wherein the restriction means is further configured to restrict the fluid flow at high stroke speeds.

11. The front fork according to claim 1, wherein said telescopic fork leg is one of a compression leg and a rebound leg, configured to mainly damp movements in a compression stroke or a rebound stroke, respectively.

12. The front fork according to claim 1, wherein said main piston arrangement comprises an electrically controlled valve for controlling the flow of damping medium.

13. The front fork according to claim 1, comprising two telescopic fork legs.

14. The front fork according to claim 13, wherein one of said two telescopic fork legs is a compression leg configured to mainly damp movements in a compression stroke, and the other one of said two telescopic fork legs is a rebound leg configured to mainly damp movements in a rebound stroke.

15. A vehicle comprising a telescopic front fork according to claim 1 for damping movements between a vehicle wheel and vehicle chassis.

16. The front fork according to claim 1, wherein said damping fluid is a damping oil, and said pressurized fluid is a gas.

17. The front fork according to claim 16, wherein the gas is selected from the group consisting of air, nitrogen, and $CO_2$.

* * * * *